US011265862B2

(12) United States Patent
Liu et al.

(10) Patent No.: US 11,265,862 B2
(45) Date of Patent: Mar. 1, 2022

(54) METHODS FOR TRANSMITTING AND RECEIVING CONTROL CHANNEL, BASE STATION, AND USER EQUIPMENT

(71) Applicant: HUAWEI TECHNOLOGIES CO., LTD., Guangdong (CN)

(72) Inventors: Kunpeng Liu, Beijing (CN); Chaojun Li, Beijing (CN); Qiang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/793,900

(22) Filed: Feb. 18, 2020

(65) Prior Publication Data

US 2020/0187180 A1 Jun. 11, 2020

Related U.S. Application Data

(63) Continuation of application No. 15/630,837, filed on Jun. 22, 2017, now Pat. No. 10,575,292, which is a
(Continued)

(30) Foreign Application Priority Data

Jan. 9, 2012 (CN) .......................... 201210004650.4

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01); *H04L 5/0053* (2013.01); *H04W 72/0453* (2013.01)

(58) Field of Classification Search
CPC ........................ H04W 72/042; H04L 5/0053
See application file for complete search history.

(56) References Cited

U.S. PATENT DOCUMENTS 9,144,070 B2  9/2015 Yang et al.
9,426,796 B2  8/2016 Liu et al.
(Continued)

FOREIGN PATENT DOCUMENTS

CN 101159470 A 4/2008
CN 101267239 A 9/2008
(Continued)

OTHER PUBLICATIONS

"3GPP TS 36.216 V10.3.1 (Sep. 2011), 3rd Generation Partnership Project;Technical Specification Group Radio Access Network;Evolved Universal Terrestrial Radio Access (E-UTRA);Physical layer for relaying operation(Release 10), 16 pages".
(Continued)

*Primary Examiner* — Robert C Scheibel

(57) ABSTRACT

Embodiments of the present invention provide methods for transmitting and receiving a control channel, a base station, and a user equipment, which relate to the communication field, and can solve a transmission problem of available changing transmission resources caused by introduction of an E-PDCCH. A method for configuring a control channel resource includes: determining, by a base station according to a system configuration and/or user configuration, resource elements REs included in an extended control channel element E-CCE, and transmitting an extended physical downlink control channel E-PDCCH to a user equipment, where the E-PDCCH is carried by the E-CCE; and receiving, by the user equipment, the E-PDCCH, and obtaining the REs included in the E-CCE, and receiving, over the REs included in the E-CCE, the E-PDCCH transmitted by the base station. The embodiments of the present invention are used for configuring and detecting a control channel resource.

23 Claims, 6 Drawing Sheets

Related U.S. Application Data continuation of application No. 15/211,686, filed on Jul. 15, 2016, now Pat. No. 9,706,542, which is a continuation of application No. 14/326,644, filed on Jul. 9, 2014, now Pat. No. 9,426,796, which is a continuation of application No. PCT/CN2013/070252, filed on Jan. 9, 2013.

(56) References Cited

U.S. PATENT DOCUMENTS

| | | |
|---|---|---|
| 2009/0303978 A1 | 12/2009 | Pajukoski et al. |
| 2010/0080154 A1 | 4/2010 | Noh et al. |
| 2011/0019776 A1* | 1/2011 | Zhang .................. H04L 5/0048 375/340 |
| 2011/0044391 A1 | 2/2011 | Ji et al. |
| 2011/0075624 A1 | 3/2011 | Papasakellariou et al. |
| 2011/0249633 A1 | 10/2011 | Hong et al. |
| 2011/0268062 A1 | 11/2011 | Ji et al. |
| 2011/0310829 A1 | 12/2011 | Ji et al. |
| 2012/0320846 A1 | 12/2012 | Papasakellariou et al. |
| 2013/0039284 A1* | 2/2013 | Marinier .................. H04L 5/001 370/329 |
| 2013/0044692 A1 | 2/2013 | Nory et al. |
| 2013/0044727 A1* | 2/2013 | Nory .................. H04L 5/0092 370/330 |
| 2013/0077590 A1 | 3/2013 | Xue et al. |
| 2013/0107822 A1* | 5/2013 | Papasakellariou .... H04W 72/04 370/329 |
| 2013/0114521 A1 | 5/2013 | Frenne et al. |
| 2013/0114529 A1 | 5/2013 | Chen et al. |
| 2013/0114530 A1 | 5/2013 | Chen et al. |
| 2013/0114565 A1 | 5/2013 | Chen et al. |
| 2013/0148623 A1 | 6/2013 | Nishio et al. |
| 2013/0170449 A1 | 7/2013 | Chen et al. |
| 2014/0056279 A1 | 2/2014 | Chen et al. |
| 2014/0140298 A1 | 5/2014 | Han et al. |
| 2014/0140306 A1 | 5/2014 | Malladi et al. |
| 2014/0211717 A1 | 7/2014 | Jitsukawa |
| 2014/0307560 A1 | 10/2014 | Kim et al. |
| 2014/0307700 A1 | 10/2014 | Seo et al. |
| 2015/0085766 A1 | 3/2015 | Kim et al. |

FOREIGN PATENT DOCUMENTS

| | | |
|---|---|---|
| CN | 101399647 A | 4/2009 |
| CN | 101895988 A | 11/2010 |
| CN | 101931600 A | 12/2010 |
| CN | 101938793 A | 1/2011 |
| CN | 101998526 A | 3/2011 |
| CN | 102014491 A | 4/2011 |
| CN | 102036297 A | 4/2011 |
| CN | 102045848 A | 5/2011 |
| CN | 102075233 A | 5/2011 |
| CN | 102082600 A | 6/2011 |
| CN | 102170703 A | 8/2011 |
| CN | 102256358 B | 11/2013 |
| EP | 2383928 A2 | 11/2011 |
| KR | 20110020732 A | 3/2011 |
| KR | 20110112750 A | 10/2011 |
| WO | 2010049754 A1 | 5/2010 |
| WO | 2010118781 A1 | 10/2010 |
| WO | 2010134742 A3 | 3/2011 |
| WO | 2011037439 A3 | 9/2011 |
| WO | 2011126212 A3 | 1/2012 |
| WO | 2011136523 A3 | 3/2012 |

OTHER PUBLICATIONS

3rd Generation Partnership Project, Technical Specification Group Radio Access Network, Evolved Universal Terrestrial Radio Access (E-UTRA), Physical Channels and Modulation (Release 10), 3GPP TS 36.211 v10.4.0, Dec. 2011, 101 pages.

"Resource multiplexing of E-PDCCH", Samsung, 3GPP TSG RAN WG1#67, Nov. 14-18, 2011, 3 pages.

3rd Generation Partnership Project, Technical Specification Group Radio Access Network; Evolved Universal Terrestrial Radio Access (E-UTRA); Physical layer procedures (Release 1 O), 3GPP TS 36 213 v10.4 0, Dec. 2011, 125 pages.

"Considerations on search space design To E-PDCCH", Potevio, 3GPP TSG RAN WG1 meeting#67, Nov. 14-18, 2011, 3 pages.

"Mapping Design for E-PDCCH in Rel-11", NTT Decomo, 3GPP TSG RAN WG1 Meeting #67, Nov. 14-18, 2011,5 pages.

"DL Control Signaling Enhancements", Samsung, 3GPP TSG RAN WG1#66bis, Oct. 10-14, 2011, 4 pages, R1-113100.

Intel Corporation, "Analysis of DCI Multiplexing in ePDCCH Design", Nov. 14-18, 2011; 3GPP TSG RAN WG1 Meeting #67, R1-113950, pp. 1-5.

Love, et al, "Downlink Control Channel Design for 3GPP LTE", 2008, IEEE Comunications Society, pp. 813-818.

Samsung,"Performance evaluation of enhanced control channel based on UE-specific reference signaling",3GPP TSG RAN WG1 #67, R1-114240, San Francisco, USA, Nov. 14-18, 2011, total 7 pages.

Shi Xinjun, Research and Implementation of Channel Estimation in LTE System. Beijing University of Posts and Telecommunications, 2011, 1 page.

Samsung, Resource multiplexing of E-PDCCH. 3GPP TSG RAN WG1 #67, San Francisco, USA, Nov. 14-18, 2011, R1-114241, 3 pages.

Xiaoli Chen et al., Novel Resource Allocation schemes in LTE PDCCH. 2012 IEEE 14th International Conference on Communication Technology , Nov. 9, 2012, 5 pages.

Jani Puttonen et al., Impact of Control Channel Limitations on the LTE VoIP Capacity. 2010 Ninth International Conference on Networks, Jun. 1, 2010, 6 pages.

* cited by examiner

| A user equipment obtains resource elements REs included in a control channel element E-CCE, where the REs included in the E-CCE are determined according to a system configuration and/or user configuration | S201 |

| The user equipment receives, over the REs included in the E-CCE, an extended physical downlink control channel E-PDCCH transmitted by a base station | S202 |

METHODS FOR TRANSMITTING AND RECEIVING CONTROL CHANNEL, BASE STATION, AND USER EQUIPMENT

CROSS-REFERENCE TO RELATED APPLICATION

This application is a continuation of U.S. patent application Ser. No. 15/630,837, filed on Jun. 22, 2017, now U.S. Pat. No. 10,575,292 which is a continuation of U.S. patent application Ser. No. 15/211,686, filed on Jul. 15, 2016, now U.S. Pat. No. 9,706,542. The U.S. patent application Ser. No. 15/211,686 is a continuation of U.S. patent application Ser. No. 14/326,644, filed on Jul. 9, 2014, now U.S. Pat. No. 9,426,796, which is a continuation of International Application No. PCT/CN2013/070252, filed on Jan. 9, 2013. The International Application claims priority to Chinese Patent Application No. 201210004650.4, filed on Jan. 9, 2012. All of the afore-mentioned patent applications are hereby incorporated by reference in their entireties.

TECHNICAL FIELD

The present invention relates to the communication field, and in particular, to methods for transmitting and receiving a control channel, a base station, and a user equipment.

BACKGROUND

In downlink transmission in a long term evolution (LTE) Rel-8/9/10 communication system, an evolved base station (eNB for short) transmits a physical downlink shared channel (PDSCH) and a corresponding physical downlink control channel (PDCCH) to each scheduled user equipment according to a scheduling result.

The PDCCH is used to transmit scheduling indication signaling for uplink or downlink data transmission of a user, where the scheduling indication signaling includes: resource allocation of a data channel, a modulation and coding scheme, and so on. Each PDCCH is made up of 1/2/4/8 control channel elements (CCE), respectively corresponding to different encoding rates. Each CCE is mapped to a group of specific time-frequency REs (RE) in a PDCCH region.

In a further evolution of an LTE Rel-10 system, multiple user multiple input multiple output (MU MIMO) and multi-cell coordination need to be supported to improve system performance, and the number of simultaneously scheduled user equipments is increased by these technologies; however, the capacity of the PDCCH is limited, which limits the number of user equipments that can be scheduled by a base station. Therefore, the prior art enhances the PDCCH, that is, divides a part of resources from an original physical downlink shared channel (PDSCH) region, for transmitting an extended PDCCH, Extended-Physical Downlink Control Channel (E-PDCCH), thereby increasing the capacity of the PDCCH and the number of simultaneously scheduled user equipments.

Because the introduced E-PDCCH needs to satisfy system configuration and user configuration requirements that change continuously in transmission and reception processes, an Extended-Control Channel Element, extended control channel element (E-CCE) that carries the E-PDCCH is required to keep changing semi-statically or dynamically. However, the E-CCE in the prior art is fixed, and a transmission problem of available changing transmission resources caused by introduction of the E-PDCCH cannot be solved. Therefore, the prior art has problems of low transmission efficiency and too high transmission complexity in transmission involving the E-PDCCH.

SUMMARY

Embodiments of the present invention provide methods for transmitting and receiving control channel, base station, and user equipment, a base station, and a user equipment, which can solve a transmission problem of available changing transmission resources caused by introduction of an E-PDCCH, improve transmission efficiency, and reduce transmission complexity.

To achieve the preceding objective, embodiments of the present invention adopt the following technical solutions:

In one aspect, a method for transmitting a control channel is provided and includes:

determining, according to a system configuration and/or user configuration, resource elements REs included in an extended control channel element E-CCE; and transmitting an extended physical downlink control channel E-PDCCH to a user equipment, where the E-PDCCH is carried by the E-CCE.

In one aspect, a method for receiving a control channel is provided and includes:

obtaining resource elements REs included in an extended control channel element E-CCE, where the REs included in the E-CCE are determined according to a system configuration and/or user configuration; and receiving, over the REs included in the E-CCE, an extended physical downlink control channel E-PDCCH transmitted by a base station.

In another aspect, a base station is provided and includes:

a processing unit, configured to determine, according to a system configuration and/or user configuration, resource elements REs included in an extended control channel element E-CCE; and a transmitting unit, configured to transmit an extended physical downlink control channel E-PDCCH to a user equipment, where the E-PDCCH is carried by the E-CCE.

In another aspect, a user equipment is provided and includes:

a processing unit, configured to obtain resource elements REs included in an extended control channel element E-CCE, where the REs included in the E-CCE are determined according to a system configuration and/or user configuration; and a receiving unit, configured to receive, over the REs included in the E-CCE, an extended physical downlink control channel E-PDCCH transmitted by a base station.

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
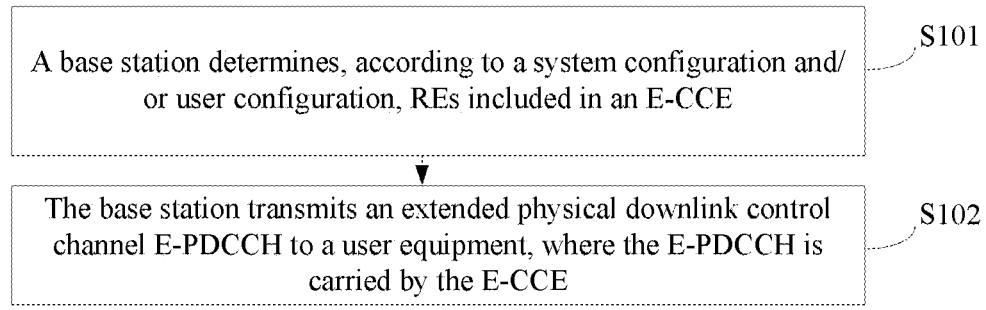
FIG. 1 is a schematic flowchart of a method for transmitting a control channel according to an embodiment of the invention.

An embodiment of the present invention provides a method for configuring a control channel resource. As shown in FIG. 1, the method includes the following steps:

S101. A base station determines, according to a system configuration and/or user configuration, REs included in an E-CCE.

Further, the base station determines an E-CCE according to the system configuration and/or user configuration, which includes: determining an E-CCE of a first type that includes a fixed number of REs on a first specific resource; and determining an E-CCE of a second type that includes a semi-statically or dynamically changing number of REs on a second specific resource.

It should be noted that only the E-CCE including a fixed number of REs is used in the prior art. However, more users need to be scheduled to join an E-PDCCH, where an E-CCE carrying the E-PDCCH is affected by different system configurations or user configurations or actual transmission conditions on the transmitted second specific resource, resulting in a change of the number of REs included in the E-CCE, but the existing E-CCE cannot adapt to the change because it includes a fixed number of REs. Therefore, at least one embodiment of the present invention provides an E-CCE of another type that includes a dynamically changing number of REs on the second specific resource, which is marked as an E-CCE of a second type, in addition to the existing E-CCE of the first type that includes a fixed number of REs on the first specific resource, and uses the changing number of REs included in the E-CCE of the second type to solve the transmission bearing problem of changing resources caused by introduction of an E-PDCCH.

Exemplarily, in the E-CCE of the first type and the E-CCE of the second type, the REs included in the E-CCE of the first type are fixed in a first specific resource, for example, fixed and unchanged in a 5 ms period of a channel state information—reference signal (CSI-RS); the REs included in the E-CCE of the second type may change dynamically on each transmitted second specific resource block according to different system configurations and/or user configurations. For example, the number of REs included in a subframe transmitted for the first time is different from the number of REs included in a subframe transmitted for the second time. In the subframe transmitted for the first time, three E-CCEs respectively include 35, 32, and 33 REs, while in the subframe transmitted for the second time, three E-CCEs respectively include 33, 31, and 34 REs. In the subframe transmitted for the second time, the number of subcarriers and the number of OFDM symbols included in a PDCCH are different from those in the subframe transmitted for the first time, and pilot overheads including a CSI-RS, a DMRS, and a CRS and overheads of other channels are also different. Consequently, the number of REs included in the E-CCE of the second type changes dynamically.

Further, the E-CCE of the first type and the E-CCE of the second type are mapped in the time domain and frequency domain respectively according to a certain rule, and the E-CCE of the first type and the E-CCE of the second type respectively have their own features, for example, the port position of a demodulation pilot DMRS of the E-CCE of the first type is fixed, and the port position of a demodulation pilot DMRS of the E-CCE of the second type may change continuously according to a system presetting. For example, the DMRS port of the E-CCE of the first type may be port 7 and port 8, or may be port 7, port 8, port 9, and port 10; the DMRS port of the E-CCE of the second type may be indefinite, for example, any N of port 7, port 8, port 9, and port 10, where N is a positive integer greater than or equal to 1.

S102. The base station transmits an extended physical downlink control channel E-PDCCH to a user equipment, where the E-PDCCH is carried by the E-CCE.

Further, in a specific application, the E-CCE of the first type is transmitted in transmit diversity mode or open-loop beamforming mode; and the E-CCE of the second type is transmitted in open-loop beamforming mode. If the E-CCE of the first type is transmitted in transmit diversity mode, the frequency domain may include 4M subcarriers, where M is a positive integer greater than or equal to 1.

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

Further, the base station performs calculation according to the number of REs included in a resource set and the number of REs included in other overheads, and then rounds off the calculation result to obtain the number of available REs in an E-CCE of a first type, where the number of available REs is marked as Z; and if Z is greater than a preset first threshold and smaller than a preset second threshold, the base station sets Z to the number of REs included in each E-CCE of the first type on the first specific resource;

or if Z is smaller than a preset first threshold, the base station sets the first threshold to the number of REs included in each E-CCE of the first type on the first specific resource;

or if Z is greater than a preset second threshold, the base station sets the second threshold to the number of REs included in each E-CCE of the first type on the first specific resource.

Exemplarily, the base station marks the total number of REs for carrying the E-CCE of the first type in a resource set as Z according to the number of REs included in the resource set, for example, according to the number of REs included in a physical resource block (PRB), or a physical resource block pair (PRB pair), or a precoding resource block group (PRG), or an resource block group (RBG), or the number of REs included in a resource set divided into various E-CCE resources by the base station, for example, included in a half PRB; and predetermines overheads. For example, if the PDCCH includes M REs, a DMRS overhead includes N REs, and a resource set fixedly has Y E-CCEs of the first type on the first specific resource, the number of REs included in each E-CCE of the first type is: $Z=\text{floor}((X-M-N)/Y)$, that is, Z is rounded off to an integer, or $Z=\max(\text{floor}((X-M-N)/Y), A)$, where A is a lowest threshold set for the purpose of reaching a demodulation effect by preventing the case that the number of calculated REs included in the E-CCE of the first type is too small, where the lowest threshold is marked as a first threshold A, and the value may be a fixed constant and may also be changed according to the actual condition; or $Z=\min(\text{floor}((X-M-N)/Y), B)$, similarly, where B is a preset second threshold B set for the purpose of avoiding waste by preventing the case that the REs included in the E-CCE of the first type are far more than the resources needed for carrying, where B may be a fixed constant or may also be a variable.

It should be noted that the predetermined overheads include a pilot overhead and overheads of other channels. For example, the pilot overhead is a CSI-RS or a CRS or a DMRS, or a muted RE not transmitting any signal to avoid interference to the CSI-RS transmission position of a neighboring cell; the overheads of other channels are one or more of a PDCCH channel overhead, a paging channel overhead, or a synchronization channel overhead. The pilot overhead on the first specific resource may be one or more of the above pilot overheads. It should be noted that the pilot overhead on the first specific resource may be different from the pilot overhead on the second specific resource.

Or, exemplarily, the number of REs included in each E-CCE of the first type is calculated according to the total number of REs included in all E-CCEs of the first type and the number of REs included in the predetermined overheads in the resource set and the number of E-CCEs of the first type in the resource set, and is marked as X; X is set to the number of REs included in each E-CCE of the first type on the first specific resource. The resource set may be all REs included in all E-CCEs of the first type in a PRB and is marked as L, but is not limited to the number of REs included in a PRB in the above example. Because a PRB has REs not carrying any information, only REs carrying all E-CCEs of the first type are used for calculation, which may make the calculation result more accurate. The calculation method may also be the method illustrated in the above example, where $X=\text{floor}((L-M-N)/Y)$ or $X=\max(\text{floor}((L-M-N)/Y), A)$ or $Z=\min(\text{floor}((X-M-N)/Y), B)$. The use rule is described in the above example and will not be further described herein.

Further, the base station may preset the number of REs included in each E-CCE of the first type on the first specific resource, where the number of REs is marked as K, and sets K to the number of REs included in each E-CCE of the first type on the first specific resource. Therefore, no calculation is required and the operation step can be simplified.

Or, exemplarily, the base station divides the resource set according to the number of E-CCEs of the first type to obtain resource subsets. For example, if a PRB has three E-CCEs of the first type, the base station regards all REs included in each E-CCE of the first type as a resource subset, obtains a unique value by using a specific function according to the number of available REs obtained after the predetermined overheads are subtracted from each resource subset, and sets the unique value to the number of REs included in each E-CCE of the first type on the first specific resource. For example, a specific function is used for calculation to obtain the minimum value of the numbers of the REs included in the E-CCEs of the first type in the resource subsets, and the minimum value is set to the number of REs included in each E-CCE of the first type.

Further, the base station sets the number of REs included in each E-CCE of the first type according to the fixed position of each E-CCE of the first type on a subcarrier and a fixed position including an orthogonal frequency division multiplexing OFDM symbol, and fixes the subcarrier position of each E-CCE and the position of the OFDM symbol; the number of the subcarrier occupied by each E-CCE and the number of the OFDM symbol are fixed. It is assumed that: the first E-CCE of the first type includes #0 subcarrier to #2 subcarrier, which include #0 OFDM symbol to #13 OFDM symbol; the second E-CCE of the first type includes #3 subcarrier to #5 subcarrier, which include #0 OFDM symbol to #13 OFDM symbol, and so on. If four E-CCEs of the first type exist now, and the number of available REs for the first E-CCE of the first type after the reference signal (RS, or pilot signal) overheads of other channels are subtracted is X1, the number of available REs for the second E-CCE of the first type after the RS overheads of other channels are subtracted is X2, the number of available REs for the third E-CCE of the first type is X3, and the number of available REs for the fourth E-CCE of the first type is X4, the number of REs included in each E-CCE of the first type is fixedly $Y=f(X1, X2, X3, X4)$; the number of REs included in each E-CCE of the first type is set to a proper value, and the number of REs occupied by each E-CCE of the first type on the first specific resource is set according to the fixed value.

Or, exemplarily, the base station may also divide the resource set according to the number of E-CCEs of the first type to obtain resource subsets, and respectively set the number of available REs after the predetermined overheads are subtracted from each resource subset to the number of REs included in each E-CCE of the first type on the first specific resource; if a PRB includes three E-CCEs, and each E-CCE of the first type is used as a resource subset, the base station calculates the number of REs included in each E-CCE of the first type by subtracting the predetermined overheads, and then sets the number of REs included in each E-CCE to the number of REs included in the E-CCE of the first type, and does not use a uniform value so that all E-CCEs include the same number of REs; therefore, accuracy is high. Assuming that the RE position occupied by each E-CCE of the first type is fixed, the base station sets, according to the number of REs obtained after the predetermined overheads are subtracted from the total number of RE positions included in a same E-CCE of the first type, the number of REs included in the E-CCE of the first type; for example, the fixed position of the first E-CCE of the first type is (k1, M1), where k1 is the number of a subcarrier, and M1 is the number of an OFDM symbol, and the fixed position of the second E-CCE of the first type is (k2, M2), where k2 is the number of a subcarrier, and M2 is the number of an OFDM symbol, and so on. Still assuming that four E-CCEs of the first type exist, the base station adds up all REs included in the fixed positions of the first E-CCE of the first type to obtain the number of REs included in the first E-CCE of the first type on the first specific resource, and so on, obtains the number of REs respectively included in the four E-CCEs of the first type, and correspondingly performs a setting, so that the number of REs included in each E-CCE of the first type is different.

Or, exemplarily, the base station may further correspondingly set, according to the preset PRG, or RBG, or system bandwidth, or configured control channel bandwidth, or different aggregation levels, or different parameters of different E-CCEs at a same aggregation level, the number of REs included in the E-CCE of the first type on the first specific resource, as shown in Tables 1, 2, 3, 4, and 5, and correspondingly obtain the number of REs included in the E-CCE of the first type on the first specific resource, and set the number of REs to the number of REs included in each E-CCE of the first type on the first specific resource.

TABLE 1

| System Bandwidth | Number of REs Included in the E-CCE of the First Type |
| --- | --- |
| ≤10 | X1 |
| 11-26 | X2 |
| 27-63 | X3 |
| 64-110 | X4 |

TABLE 2

| Configured E-PDCCH Bandwidth | Number of REs Included in the E-CCE of the First Type |
| --- | --- |
| Y1 | X1 |
| Y2 | X2 |
| Y3 | X3 |
| Y4 | X4 |

TABLE 3

| RBG | Number of REs Included in the E-CCE of the First Type |
| --- | --- |
| Z1 | X1 |
| Z2 | X2 |

TABLE 3-continued

| RBG | Number of REs Included in the E-CCE of the First Type |
| --- | --- |
| Z3 | X3 |
| Z4 | X4 |

TABLE 4

| PRG | Number of REs Included in the E-CCE of the First Type |
| --- | --- |
| W1 | X1 |
| W2 | X2 |
| W3 | X3 |
| W4 | X4 |

TABLE 5

| E-PDCCH Format | Number of E-CCEs Included at the Aggregation Level | Number of REs Included in the E-CCE of the First Type |
| --- | --- | --- |
| F1 | M1 | K1 |
| F2 | M2 | K2 |
| F3 | M3 | K3 |
| F4 | M4 | K4 |

The above methods are several examples about how the base station sets the number of REs of the E-CCE of the first type on the first specific resource; the following methods are several examples about setting the number of REs of the E-CCE of the second type on the second specific resource. It should be noted that any one of the above methods for setting the number of REs of the E-CCE of the first type on the first specific resource is used with any one of the following methods for setting the number of REs of the E-CCE of the second type on the second specific resource, which is not limited in any way.

Exemplarily, the base station performs calculation according to the number of REs included in the current resource set and the number of REs included in other overheads, and then rounds off the calculation result to obtain the number of available REs included in an E-CCE, where the number of available REs is marked as Z';

if Z' is greater than a preset first threshold and smaller than a preset second threshold, the base station sets Z' to the number of REs occupied currently by each E-CCE of the second type on the second specific resource;

or if Z' is smaller than a preset first threshold C, the base station sets C to the number of REs currently occupied by each E-CCE of the second type on the second specific resource;

or if Z' is greater than a preset second threshold D, the base station sets D to the number of REs currently occupied by each E-CCE of the second type on the second specific resource.

It should be noted that because the resource set transmitted by the base station every time is different according to the system configuration and/or actual transmission condition, the base station subtracts the number of REs included in various pilot RSs from the total number L of REs for carrying the E-CCE of the second type in the current resource set. For example, if a CSI-RS includes S REs, a DMRS includes N REs, and overheads of a PDCCH and other channels include M REs, the number of REs included in each E-CCE of the second type is obtained by calculation:

$Z'=\text{floor}((L-M-N-S)/Y)$, or $Z'=\max(\text{floor}((L-M-N-S)/Y), C)$, or $Z'=\min(\text{floor}((L-M-N-S)/Y), D)$. The principle of setting C and D is the same as that of setting A and B in the E-CCE of the first type, and will not be further described herein.

It should be noted that the base station may further perform the above calculation according to the total number X of the REs for carrying in the search position of the E-CCE of the second type in the control channel, so as to more accurately obtain the number of REs of the E-CCE of the second type on the specific resource. For example, the search space of the E-CCE of the second type is in the middle position of an RBG, where the total number of the REs for carrying is L. For example, the search position space of the E-CCE of the second type in the control channel is in the middle position of an RBG, where the number of REs included in each E-CCE is calculated according to the total number L of REs for carrying, the number of REs included in the predetermined overheads, and the number Y of E-CCEs in the resource set and marked as X', and X' is set to the number of REs included in each E-CCE of the second type on the second specific resource. It should be noted that the calculation method may also be the method in the above example, where $X'=\text{floor}((L-M-N)/Y)$ or $X'=\max(\text{floor}((L-M-N)/Y), A)$ or $X'=\min(\text{floor}((L-M-N)/Y), B)$; the use rule is described in the above example, and will not be further described herein.

It should be noted that the predetermined overheads are described in detail in the above content and will not be further described herein. However, the pilot overhead of the E-CCE of the second type may be different from that of the E-CCE of the first type, and is not limited by the E-CCE of the first type in any way.

Or, exemplarily, according to the preset number, which is marked as Y', of REs currently included in each E-CCE of the second type on the second specific resource, the base station sets Y' to the number of REs currently included in each E-CCE of the second type on the second specific resource, and no calculation is further required.

Or, exemplarily, the base station divides the resource set according to the current number of E-CCEs of the second type to obtain resource subsets, obtains a unique value by using a current specific function according to the number of available REs obtained after the predetermined overheads are subtracted from each resource subset, and sets the unique value to the number of REs currently included in each E-CCE of the second type on the second specific resource.

It is assumed that: the position of each E-CCE of the second type on the current second specific resource is fixed on a subcarrier, and a position including an orthogonal frequency division multiplexing OFDM symbol every time is fixed; the current subframe has four E-CCEs of the second type; the first E-CCE of the second type includes #4 subcarrier to #7 subcarrier, which include #5 OFDM symbol to #9 OFDM symbol; the second E-CCE of the second type includes #3 subcarrier to #7 subcarrier, which include #5 OFDM symbol to #9 OFDM symbol, and so on. If four E-CCEs of the second type exist now, and the number of available REs for the first E-CCE of the second type after the overhead of the RS under the current channel condition, especially the overhead of the CSI-RS, and overheads of other channels are subtracted is Y1', the number of available REs for the second E-CCE of the second type after the overhead of the RS and overheads of other channels are subtracted is Y2', and no CSI-RS in the fixed position set for the second E-CCE of the second type includes an RE, the overhead of the CSI-RS does not need to be subtracted during calculation; if the number of available REs for the third E-CCE of the second type is Y3', and the number of available REs for the fourth E-CCE of the second type is Y4', the number of REs included in each E-CCE of the second type is fixedly $Z'=f(Y1', Y2', Y3', Y4')$.

Preferably, the base station may select the minimum value of the numbers of available REs for carrying in the E-CCEs of the second type as the number of REs occupied by each E-CCE of the second type on the second specific resource, that is, $Y'=\min(Y1', Y2', Y3', Y4')$, and set Y' to the number of REs occupied by each E-CCE of the second type.

It should be noted that the number of REs included in the E-CCE of the second type is only applicable to the current second specific resource; on the next second specific resource, the number of REs included in the E-CCE of the second type is reset.

Or, exemplarily, the base station divides the resource set according to the current number of E-CCEs of the second type or a preset integer to obtain resource subsets, and sets the number of available REs obtained after other overheads are subtracted from each resource subset, to the number of REs included in each E-CCE of the second type on the current second specific resource. Because each resource subset also has some REs that do not carry any information and are not included in the total number L, the method of calculation according to the total number of REs actually included in each E-CCE of the second type precludes the impact caused by the REs not carrying any information on calculation accuracy, so that the calculation result is more accurate.

For example, the serial number of a subcarrier occupied by each E-CCE of the second type on the second specific resource and the serial number of an OFDM symbol are fixed. It is assumed that: the first E-CCE of the second type includes #0 subcarrier to #2 subcarrier, which include #0 OFDM symbol to #13 OFDM symbol; the second E-CCE of the second type includes #3 subcarrier to #5 subcarrier, which include #0 OFDM symbol to #13 OFDM symbol, and so on. If four E-CCEs of the second type exist now, and the number of available REs for the first E-CCE of the second type after the overhead of the RS (Reference Signal, pilot signal) and overheads of other channels and so on are subtracted is Y1', the number of available REs for the second E-CCE of the second type after the overhead of the RS and overheads of other channels are subtracted is Y2', the number of available REs for the third E-CCE of the second type is Y3', and the number of available REs for the fourth E-CCE of the second type is Y4', the number of REs included in each E-CCE of the second type is fixedly $Y=f(Y1', Y2', Y3', Y4')$; the number of REs included in each E-CCE of the second type is set to a proper value, and the number of REs occupied by each E-CCE of the second type on the second specific resource is set according to the fixed value.

Or, exemplarily, the base station may also divide the resource set according to the current number of E-CCEs of the second type or a preset integer to obtain resource subsets, and set the number of available REs obtained after other overheads are subtracted from each resource subset, to the number of REs included in each E-CCE of the second type on the current second specific resource, so that each E-CCE of the second type includes a different number of REs according to its own specific condition.

Or, exemplarily, the base station may further correspondingly set, according to the preset PRG, or RBG, or system bandwidth, or configured control channel bandwidth, or different aggregation levels, or different parameters of different E-CCEs at a same aggregation level, the number of REs included in the E-CCE of the second type on the second specific resource, as shown in Tables 6, 7, 8, 9, and 10, and correspondingly obtain the number of REs included in the E-CCE of the second type on the second specific resource, and set the number of REs to the number of REs included in each E-CCE of the second type on the second specific resource.

TABLE 6

| System Bandwidth | Pilot and Other Overheads | Number of REs Included in the E-CCE of the Second Type |
|---|---|---|
| ≤10 | M1 | K1 |
| 11-26 | M2 | K2 |
| 27-63 | M3 | K3 |
| 64-110 | M4 | K4 |

TABLE 7

| Configured E-PDCCH Bandwidth | Pilot and Other Overheads | Number of REs Included in the E-CCE of the Second Type |
|---|---|---|
| Y1 | M1 | K1 |
| Y2 | M2 | K2 |
| Y3 | M3 | K3 |
| Y4 | M4 | K4 |

TABLE 8

| RBG | Pilot and Other Overheads | Number of REs Included in the E-CCE of the Second Type |
|---|---|---|
| Z1 | M1 | K1 |
| Z2 | M2 | K2 |
| Z3 | M3 | K3 |
| Z4 | M4 | K4 |

TABLE 9

| PRG | Pilot and Other Overheads | Number of REs Included in the E-CCE of the Second Type |
|---|---|---|
| W1 | M1 | K1 |
| W2 | M2 | K2 |
| W3 | M3 | K3 |
| W4 | M4 | K4 |

TABLE 10

| E-PDCCH Format | Number of E-CCEs Included at the Aggregation Level | Number of REs Included in the E-CCE of the Second Type |
|---|---|---|
| F1 | M1 | K1 |
| F2 | M2 | K2 |
| F3 | M3 | K3 |
| F4 | M4 | K4 |

It should be noted that Table 10 reflects that the number of REs occupied by different E-CCEs of the second type at a same aggregation level is different; during the setting, the numbers of REs occupied by E-CCEs of the second type at the same aggregation level may be different. For example, the number of REs included in the E-CCE of the second type at aggregation level 1 is 4, and the number of REs included in another E-CCE of the second type at aggregation level 1 is 5.

It should be noted that the number of REs included in the PRG is decided according to the configured control channel region, and consists of PRBs or E-CCEs. The method for setting the control channel region is different from the method for setting the PDSCH region, and may be obtained correspondingly according to Table 11.

TABLE 11

| Resource Size Configured for the E-PDCCH Region | PRG Size of the Control Channel |
|---|---|
| F1 | F1 |
| F2 | F2 |
| F3 | F3 |
| F4 | F4 |

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

Furthermore, the above embodiment of the present invention describes how the base station sets the number of REs included in the E-CCE of the first type on the first specific resource or the number of REs included in the E-CCE of the second type on the second specific resource. The following embodiment uses examples to describe how to map the E-CCE of the first type and the E-CCE of the second type.

Figure 2:
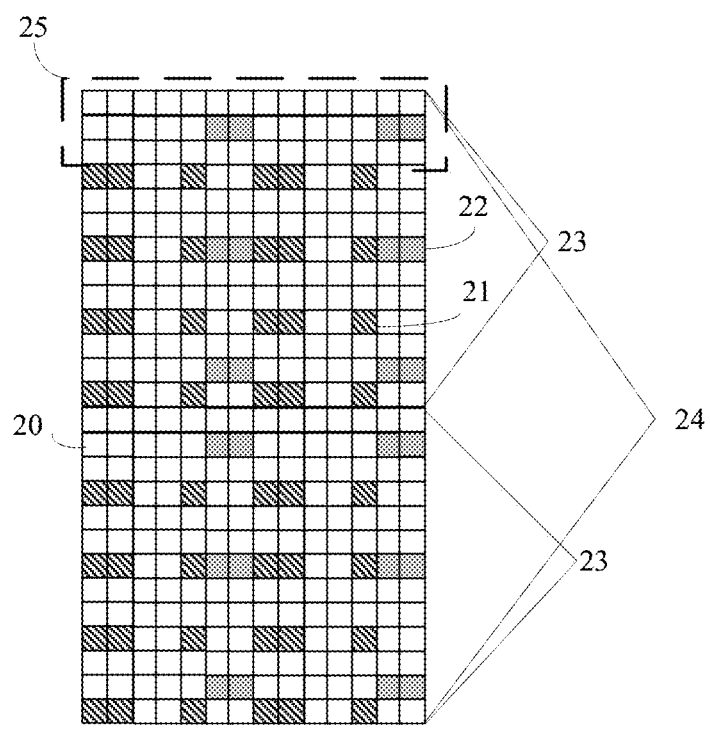
FIG. 2 is a schematic structural diagram of a mapping method for transmission of a control channel according to an embodiment of the invention.

As shown in FIG. 2, 20 represents an RE, 21 represents an RE included in a DMRS pilot, 22 represents an RE included in a CRS (Cell-specific Reference Signal, cell pilot signal), 23 represents a PRB, 24 represents a PRG or an RBG, and 25 represents a start point position of an E-CCE of a first type. From a preset start point of the E-CCE of the first type, first in a frequency domain and then in a time domain, or first in a time domain and then in a frequency domain, the REs included in the E-CCE of the first type are mapped, where if more than one RE occupied by other overheads exists during the mapping, the E-CCE of the first type is not mapped in RE positions occupied by the overheads, and the REs occupied by the overheads are correspondingly subtracted from the number of REs included in the E-CCE of the first type; or RE positions occupied by the overheads are skipped, and the determined number of REs included in the E-CCE of the first type are mapped; or the number of REs included in the E-CCE of the first type are mapped directly from a preset start point, and a control channel mapped to the positions occupied by the overheads is punched for transmitting the overheads.

From a preset start point of an E-CCE of a second type, mapping is performed according to any one of the above methods, which will not be further described herein.

Figure 3:
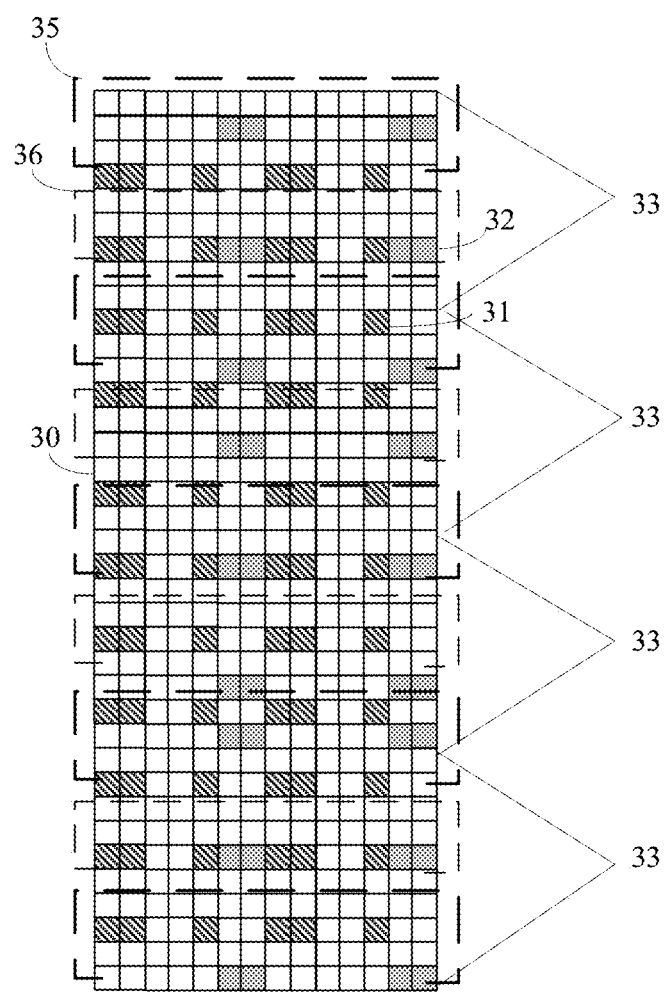
FIG. 3 is a schematic structural diagram of another mapping method for transmission of a control channel according to an embodiment of the invention.

Exemplarily, in a configured control channel region, the E-CCE of the first type or the E-CCE of the second type has an equal spacing between search start points or search spaces in the frequency domain, where the spacing is at least one subcarrier, or has an equal spacing between search start points or search spaces in the time domain, where the spacing is at least one orthogonal frequency division multiplexing OFDM symbol. As shown in FIG. 3, within the range of each PRB, PRB pair, PRG, or RBG in the configured control channel region, the position of the search start point or search space of the E-CCE of the first type is fixed in the frequency domain. For example, the E-CCE of the first type is mapped on the subcarrier of $f_i \in F1$, and the E-CCE of the second type is mapped on the subcarrier of $f_i \in F2$. The subcarrier set F1 may be divided into N subcarrier groups. In each subcarrier group, the subcarriers are continuous, and the distance between N subcarrier groups is fixed. As shown in FIG. 3, 30 represents an RE, 31 represents an RE included in a DMRS pilot, 32 represents an RE included in a CRS, 33 represents a PRB, 35 represents a search start point or search space of the E-CCE of the first type, and 36 represents a search start point or search space of the E-CCE of the second type.

Figure 4:
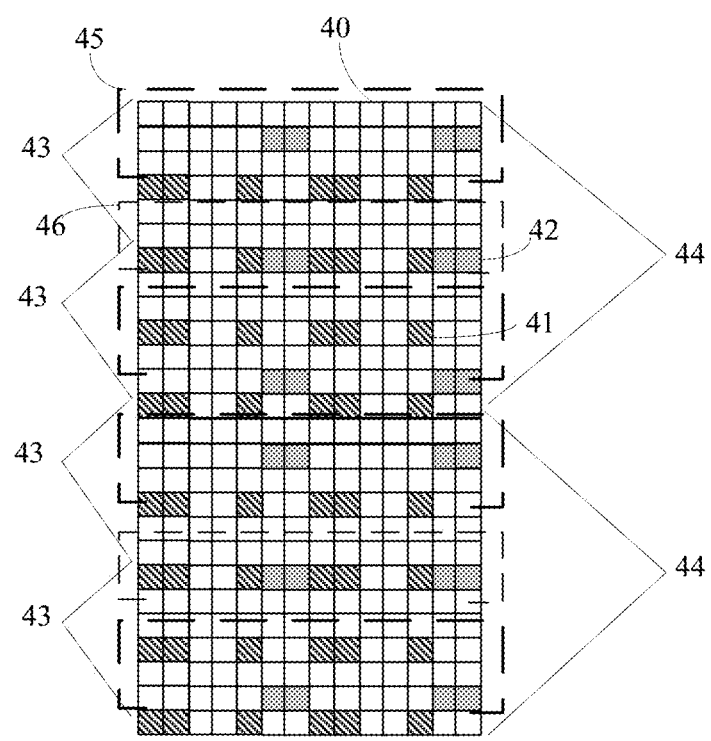
FIG. 4 is a schematic structural diagram of still another mapping method for transmission of a control channel according to an embodiment of the invention.

Or, the search start point or search space of the E-CCE of the first type is mapped in a fixed position of each PRB, PRB pair, PRG, or RBG on a subcarrier in the frequency domain; assuming that the position of the E-CCE of the first type is fixed in the range of each PRB, PRB pair, PRG, or RBG, and that the fixed position is reserved by a higher-layer configuration, as shown in FIG. 4, 40 represents an RE, 41 represents an RE included in a DMRS pilot, 42 represents an RE included in a CRS, 43 represents a PRB, 44 represents a PRG or an RBG, 45 represents the search start point or search space of the E-CCE of the first type, 46 represents the search start point or search space of the E-CCE of the second type, and the search start point or search space of the E-CCE of the first type is fixed in a middle position between two PRBs.

Figures 5, 6:
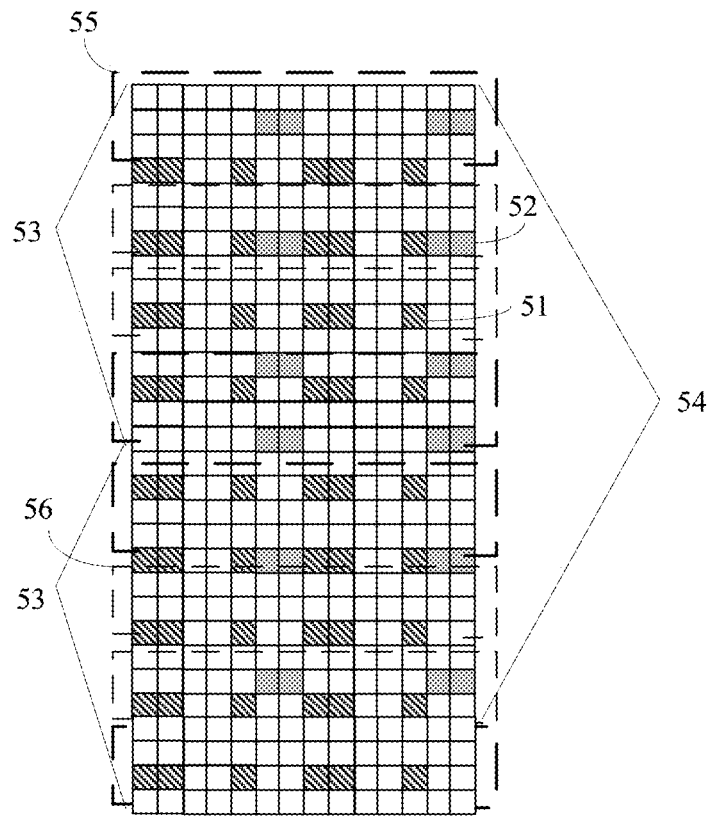
FIG. 5 is a schematic structural diagram of still another mapping method for transmission of a control channel according to an embodiment of the invention.
FIG. 6 is a schematic flowchart of a method for receiving a control channel resource according to an embodiment of the invention.

Or, the E-CCE of the first type crosses two adjacent PRBs in a PRG or an RBG. For example, search start points or search spaces of two adjacent E-CCEs of the first type, as shown in FIG. 5, are fixed in the middle position of each PRB, where 50 represents an RE, 52 represents an RE included in a DMRS pilot, 51 represents an RE included in a CRS, 53 represents a PRB, 54 represents a PRG or an RBG, 55 represents a search start point or search space of the E-CCE of the first type, and 56 represents a search start point or search space of the E-CCE of the second type. In the above description about FIG. 5, examples are only used to describe the case that the position of the search start point or search space of the E-CCE of the first type is fixed in the frequency domain, and the position is not limited in any way.

It should be noted that: E-CCEs of the first type in a same PRG have a same precoding vector and E-CCEs of the second type have a same precoding vector; the search space of the E-CCE of the first type and the search space of the E-CCE of the second type are used by frequency division multiplexing or time division multiplexing in a PRB, a PRG, or an RBG, and E-CCEs of a same type in a same PRG have a same precoding vector for performing joint channel estimation.

In another aspect, when the E-CCE of the second type is mapped in the frequency domain, the search start point or search space of the E-CCE of the second type may be fixed, where the fixed position relationship may be as shown in the above figures. However, it should be noted that the search start point or search space of the E-CCE of the second type is only fixed on the current transmitted second specific resource, and any mode of fixing the search start point or search space of the E-CCE of the second type may match any mode of fixing the search start point or search space of the E-CCE of the first type, which is not limited in any way.

In addition, when multiplexing is performed in the time domain, the E-CCE of the first type is mapped to a first resource set, where the first resource set includes a first subframe set or a first timeslot set or a first OFDM set; the E-CCE of the second type is mapped to a second resource set, where the second resource set includes a second subframe set or a second timeslot set or a second OFDM set; and the first resource set and the second resource set have an intersection or do not have an intersection.

It is assumed that: the E-CCE of the first type includes an OFDM symbol of $n_i \in A1$, and is mapped to the timeslot of $n_s \in B1$ or to the subframe of $n_f \in C1$; the E-CCE of the second type includes an OFDM symbol of $n_i \in A2$, and is mapped to the timeslot of $n_s \in B2$ or to the subframe of $n_f \in C2$ where A1 and A2 sets may have no intersection or may be partially intersected; B1 and B2 may have no intersection or may be partially intersected; C1 and B2 sets may have no intersection, or may be partially intersected.

The first resource set is a resource set including no CSI-RS or a multicast broadcast single frequency network MBSFN set; if the first resource set and the third resource set that includes a CSI-RS have an intersection, no CSI-RS is transmitted over time resources colliding in the intersection. If C1 is a subframe including no CSI-RS, or an MBSFN (Multicast Broadcast Single Frequency Networks, multicast broadcast single frequency network) subframe, the MBSFN subcarrier carries few pilots and does not carry a CSI-RS.

Or, if the subframe set C1 includes #1, #2, #3, #5, and #9, while the CSI-RS in another subframe set C3 includes #3, #4, #5, and #6, which means that the two subframe sets have a set collision on #3 and #5, in this case, #3 and #5 do not carry any information; the subframe set C1 does not transmit the E-CCE of the first type on #3 and #5; and the subframe set C3 does not transmit the CSI-RS on #3 and #5.

A1, A2, B1, B2, C1, and C2 are configured by a higher layer, or are configured fixedly according to a predetermined rule.

It should be noted that the E-CCE of the first type and the E-CCE of the second type have their own use spaces. Exemplarily, because the E-CCE carrying the E-PDCCH region is divided into a common search space and a user-specific search space, the E-CCE of the first type is used for the common search space, and the E-CCE of the second type is used for the user-specific search space.

Or, E-CCEs using different resource mapping modes are mapped to E-CCEs of different types, where, an E-CCE using discrete resource mapping is an E-CCE of the first type, and an E-CCE using centralized resource mapping is an E-CCE of the second type.

Or, when the control channel is scrambled by different RNTIs, the E-CCE of the first type or the E-CCE of the second type is used, where the E-CCE of the first type is used when the control channel is scrambled by an system information radio network temporary identifier (SI-RNTI), a paging radio network temporary identifier (P-RNTI), an random access radio network temporary identifier (RA-RNTI), and an semi-persistent scheduling C-RNTI (SPS C-RNTI), while the E-CCE of the second type is used when the control channel is scrambled by a C-RNTI.

Another case is that, according to different channel formats of control channels, the E-CCE of the first type or the E-CCE of the second type is used. For example, all control channel formats DCI formats are divided into the following groups: 1, 1A, 3, 3A, 2, 2B, and 2C, where fi is used to indicate a DCI format; the first group includes (f1, f2, . . . , $f_N$), and the second group includes ($f_{N+1}$, $f_N$), where the first group uses the E-CCE of the first type and the second group uses the E-CCE of the second type.

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

An embodiment of the present invention provides a method for receiving a control channel. As shown in FIG. 6, the method includes the following steps:

S201. A user equipment obtains resource elements REs included in an extended control channel element E-CCE, where the REs included in the E-CCE are determined according to a system configuration and/or user configuration.

Further, the user equipment obtains, on a first specific resource, an E-CCE of a first type including a fixed number of REs; and/or obtains, on a second specific resource, an E-CCE of a second type including a variable number of REs.

Exemplarily, the user equipment obtains, according to resource elements REs included in a resource set and REs of predetermined overheads in the resource set, resource elements REs included in an extended control channel element E-CCE.

Specifically, the user equipment performs calculation according to the number of REs included in the resource set and the number of REs included in the predetermined overheads, and then rounds off the calculation result to obtain the number of available REs included in an E-CCE, where the number of available REs is marked as Z; and if Z is greater than a preset first threshold and smaller than a preset second threshold, the user equipment determines Z as the number of REs included in each E-CCE of the first type on the first specific resource; or if Z is smaller than a preset first threshold, determines the first threshold as the number of REs included in each E-CCE of the first type on the first specific resource; or if Z is greater than a preset second threshold, determines the second threshold as the number of REs included in each E-CCE of the first type on the first specific resource.

The resource set is a PRB, or a PRB pair, or a PRG, or an RBG, or a set divided into various E-CCE resources. Other overheads include at least one of a pilot overhead and/or overheads of other channels, for example, the pilot overhead may be a channel state indicator-pilot symbol CSI-RS or a cell pilot signal CRS or a demodulation pilot DMRS or a muted RE; and the overheads of other channels may be a paging channel overhead or a synchronization channel overhead.

Or, exemplarily, the number of REs included in each E-CCE of the first type is calculated according to the number of REs included in the resource set and the number of REs included in the predetermined overheads and the number of E-CCEs in the resource set, and is marked as X, where X is set to the number of REs included in each E-CCE of the first type on the first specific resource.

Or, the number of REs included in each E-CCE of the first type on the first specific resource is preset and marked as Y, where Y is set to the number of REs currently included in each E-CCE of the first type on the first specific resource.

Or, exemplarily, the user equipment divides the resource set according to the number of E-CCEs to obtain resource subsets, obtains a unique value by using a specific function according to the number of available REs obtained after the predetermined overheads are subtracted from each resource subset, and determines the unique value as the number of REs included in the each E-CCE of the first type on the first specific resource. For example, the user equipment obtains the unique value by using a specific function, where the unique value is the minimum value of the number of available REs obtained after other overheads are subtracted from each resource subset.

Or, the user equipment divides, according to the number of E-CCEs, the resource set carrying the E-PDCCH to obtain resource subsets, and respectively determines the number of available REs obtained after other overheads are subtracted from each resource subset, as the number of REs included in each E-CCE of the first type in the first specific resource.

Or, the user equipment determines the number of REs included in each E-CCE of the first type in the first specific resource correspondingly according to Tables 1 to 5 of the above configuration method embodiment. That is, the user equipment correspondingly determines the number of REs included in the E-CCE of the first type according to the PRG or RBG or system bandwidth or configured control channel bandwidth or different aggregation levels or different parameters of different E-CCEs at a same aggregation level.

The number of REs included in the E-CCE of the second type on the current second specific resource may be determined according to any one of the above methods. It should be noted that when the number of REs occupied by the E-CCE of the second type is determined, the predetermined overheads may be different from those of the E-CCE of the first type. The detailed determining method may be determined according to the setting method of a base station, which is known to the user equipment, and will not be further described herein.

The user equipment performs resource demapping for the received E-CCE of the first type or E-CCE of the second type according to the number of REs respectively included therein, for example, performs resource demapping for the REs included in the E-CCE of the first type, from a preset start point of the E-CCE of the first type, first in a frequency domain and then in a time domain, or first in a time domain and then in a frequency domain; and if REs occupied by other overheads exist during the resource demapping, does not perform resource demapping for the E-CCE of the first type in RE positions occupied by the overheads, where the REs that are occupied by the overheads are correspondingly subtracted from the number of REs included in the E-CCE of the first type; or skips RE positions occupied by the overheads, and keeps performing resource demapping until the determined number of REs included in the E-CCE of the first type.

From a preset start point of the E-CCE of the second type, resource demapping is performed according to any one of the above methods, which will not be further described herein.

Further, the E-CCE of the first type or the E-CCE of the second type is detected, and the E-CCE of the first type or the E-CCE of the second type is detected according to the search start point or search space of the E-CCE of the first type or the E-CCE of the second type predicted by the user equipment.

Exemplarily, in a configured control channel region, the E-CCE of the first type or the E-CCE of the second type has an equal spacing between search start points or search spaces in the frequency domain, where the spacing is at least one subcarrier, or has an equal spacing between search start points or search spaces in the time domain, where the spacing is at least one orthogonal frequency division multiplexing OFDM symbol.

Or, in the range of each PRB, PRB pair, PRG, or RBG in a configured control channel region, the position of the search start point or search space of the E-CCE of the first type or the E-CCE of the second type is fixed.

Or, the E-CCE of the first type crosses two adjacent PRBs in a PRG or an RBG.

It should be noted that the number of REs included in the PRG, during PRG detection, is decided according to the configured control channel region, and consists of PRBs or E-CCEs. The method for setting the control channel region is different from the method for setting the physical downlink shared channel PDSCH region.

In the time domain, the E-CCE of the first type is detected in a first resource set, where the first resource set includes a first subframe set or a first timeslot set or a first OFDM symbol set; the E-CCE of the second type is detected in a second resource set, where the second resource set includes a second subframe set or a second timeslot set or a second OFDM symbol set; and the first resource set and the second resource set have an intersection or do not have an intersection.

Further, the first resource set is a resource set including a CSI-RS or is a multicast broadcast single frequency network MBSFN resource set; and if the first resource set and a third resource set that includes a CSI-RS have an intersection, no CSI-RS exists in the intersection of the resource sets.

During the detection, the corresponding information may be obtained according to the fact that the demodulation pilot DMRS port of the E-CCE of the first type is fixed and that the demodulation pilot DMRS port of the E-CCE of the second type is dynamically changeable.

Or, the user equipment detects the E-CCE of the first type in transmit diversity mode or precoding mode, and detects the E-CCE of the second type in precoding mode.

It should be noted that: the E-CCE of the first type is detected in the common search space; the E-CCE of the second type is detected in the user-specific search space. When the E-CCE of the first type is detected in the common search space, before the CSI-RS configuration or other RRC signaling is received, the E-CCE of the first type may be detected in the user-specific search space according to the number of REs included in the E-CCE of the first type; after the CSI-RS configuration or other RRC signaling is received, the E-CCE of the second type may be detected in the user-specific search space.

In addition, the user equipment detects the E-CCE of the first type or the E-CCE of the second type according to the control channel scrambled by different radio network temporary identifiers, or detects the E-CCE of the first type or the E-CCE of the second type according to the downlink control information DCI format group of the control channel.

S202. The user equipment receives, over the REs included in the E-CCE, an extended physical downlink control channel E-PDCCH transmitted by a base station.

It should be noted that the user equipment may further determine, according to the broadcast notification, system information notification, or RRC signaling notification which are transmitted by the base station, the number of REs included in the E-CCE of the first type or the E-CCE of the second type, or obtain, from a common control channel notification, the number of REs included in the CCE of the second type and the second specific resource.

Further, the user equipment may further determine whether it is an E-CCE of the first type or an E-CCE of the second type according to the start point of the CCE, or determine respective start points according to the E-CCE of the first type or the E-CCE of the second type.

In this embodiment, the user equipment may perform resource demapping and detecting according to the same setting method and mapping method known to the base station, and the repeated steps will not be further described herein.

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

Figure 7:
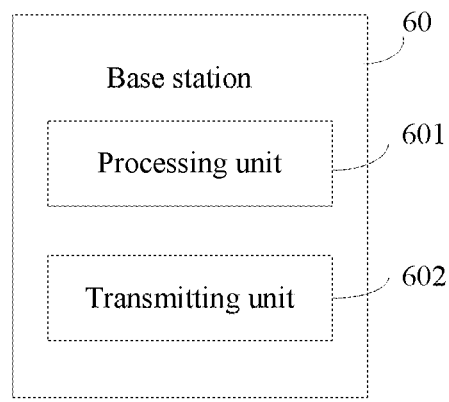
FIG. 7 is a schematic structural diagram of a base station according to an embodiment of the present invention.
Figure 8:
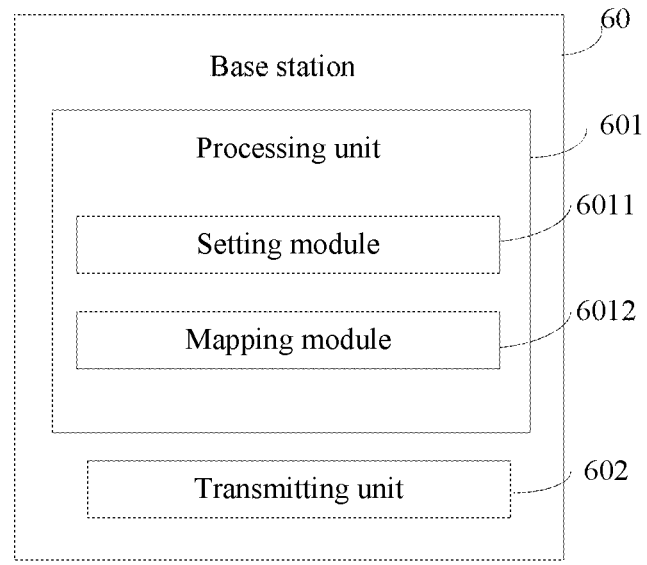
FIG. 8 is a schematic structural diagram of another base station according to an embodiment of the present invention.

A base station 60 provided by an embodiment of the present invention, as shown in FIG. 7, includes a processing unit 601 and a transmitting unit 602.

The processing unit 601 is configured to determine, according to a system configuration and/or user configuration, resource elements REs included in an extended control channel element E-CCE.

Exemplarily, as shown in FIG. 7, the processing unit 601 includes a setting module 6011 and a mapping module 6012.

The setting module 6011 is configured to determine, according to resource elements REs included in a resource set and REs of predetermined overheads in the resource set, resource elements REs included in an extended control channel element E-CCE.

The setting module 6011 is specifically configured to: obtain, according to the number of REs included in a resource set and the number of REs of predetermined overheads in the resource set, the number of available REs in the resource set; obtain, according to the number of available REs in the resource set and the number of REs of predetermined overheads in the resource set, the number of REs available for each E-CCE; and determine, according to the number of REs available for each E-CCE, the number of REs included in each E-CCE.

Or, the setting module 6011 is specifically configured to: if the number of REs available for each E-CCE is greater than a preset first threshold and smaller than a preset second threshold, determine the number of REs available for each E-CCE as the number of REs included in each E-CCE; if the number of REs available for each E-CCE is smaller than a preset first threshold, set the first threshold to the number of REs included in each E-CCE on a specific resource; and/or if the number of REs available for each E-CCE is greater than a preset second threshold, set the second threshold to the number of REs included in each E-CCE on a specific resource.

Or, the setting module 6011 is specifically configured to: divide a resource set according to the predetermined number of E-CCEs in the resource set to obtain resource subsets; obtain, according to the number of REs included in each resource subset and the number of REs of predetermined overheads in each resource subset, the number of available REs in each resource set; and determine, according to the number of available REs in each resource subset, the number of REs included in each E-CCE in the resource set.

Or, the setting module 6011 is specifically configured to determine, according to at least one of a preset precoding resource block group PRG, a resource block group RBG, a system bandwidth, a configured control channel bandwidth, different aggregation levels, and different parameters of different E-CCEs at a same aggregation level, the number of REs included in the E-CCE.

The mapping module 6012 is configured to: map, from a preset start point of the E-CCE, first in a frequency domain and then in a time domain, or first in a time domain and then in a frequency domain, the REs included in the E-CCE, where if REs occupied by the predetermined overheads exist during the mapping, the E-CCE is not mapped in RE positions occupied by the predetermined overheads, and the REs occupied by the predetermined overheads are correspondingly subtracted from the number of REs included in the E-CCE; or skip RE positions occupied by the predetermined overheads, and map the number of REs included in the E-CCE; or map the number of REs included in the E-CCE from a preset start point of the E-CCE, where a control channel mapped to the REs occupied by the predetermined overheads is punched for transmitting the predetermined overheads.

It should be noted that the E-CCEs are grouped, according to the number of included REs, into an E-CCE of a first type having a fixed number of included REs, and an E-CCE of a second type having a dynamically changeable number of included REs; the processing unit 601 performs, according to the number of REs included in the E-CCE of the first type and the E-CCE of the second type and a mapping method, multiplexing and mapping and feature processing in the time domain and frequency domain.

The transmitting unit 602 is configured to transmit an extended physical downlink control channel E-PDCCH to a user equipment, where the E-PDCCH is carried by the E-CCE.

Further, the transmitting unit 602 is specifically configured to notify REs included in the E-CCE of the first type and/or REs included in the E-CCE of the second type to the user equipment through broadcast, system information, or radio resource control protocol RRC signaling.

The above base station 60 corresponds to the above method embodiment. The base station 60 may be used in the steps of the above method embodiment, and for its specific application in each step, reference may be made to the above method embodiment, and will not be further described herein.

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

Figure 9:
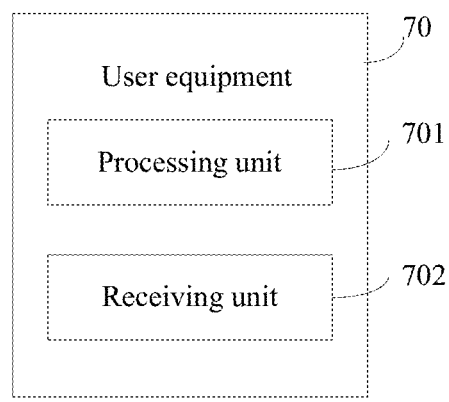
FIG. 9 is a schematic structural diagram of a user equipment according to an embodiment of the present invention.
Figure 10:
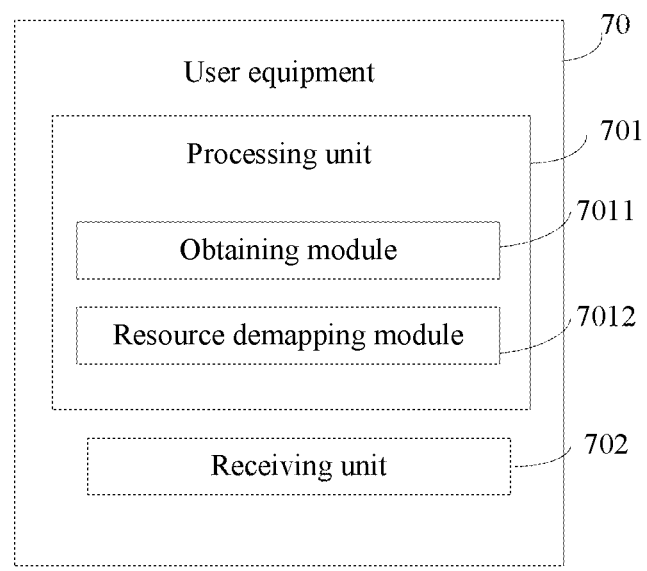
FIG. 10 is a schematic structural diagram of another user equipment according to an embodiment of the present invention.

A user equipment 70 provided by an embodiment of the present invention, as shown in FIG. 9, includes a processing unit 701 and a receiving unit 702.

The processing unit 701 is configured to obtain resource elements REs included in an extended control channel element E-CCE, where the REs included in the E-CCE are determined according to a system configuration and/or user configuration.

Further, as shown in FIG. 9, the processing unit 701 may include an obtaining module 7011 and a resource demapping module 7012.

The obtaining module 7011 is configured to obtain, according to resource elements REs included in a resource set and REs of predetermined overheads in the resource set, resource elements REs included in an extended control channel element E-CCE; and specifically configured to: obtain, according to the number of REs included in a resource set and the number of REs of predetermined overheads in the resource set, the number of available REs in the resource set; obtain, according to the number of available REs in the resource set and the number of REs of predetermined overheads in the resource set, the number of REs available for each E-CCE; and obtain, according to the number of REs available for each E-CCE, the number of REs included in each E-CCE;

or specifically configured to: if the number of REs available for each E-CCE is greater than a preset first threshold and smaller than a preset second threshold, obtain the number of REs available for each E-CCE as the number of REs included in each E-CCE; if the number of REs available for each E-CCE is smaller than a preset first threshold, obtain the first threshold as the number of REs included in each E-CCE on a specific resource; and/or if the number of REs available for each E-CCE is greater than a preset second threshold, obtain the second threshold as the number of REs included in each E-CCE on a specific resource;

or specifically configured to: divide a resource set according to the predetermined number of E-CCEs in the resource set to obtain resource subsets; obtain, according to the number of REs included in each resource subset and the number of REs of predetermined overheads in each resource subset, the number of available REs in each resource set; and obtain, according to the number of available REs in each resource subset, the number of REs included in each E-CCE in the resource set;

or configured to obtain, according to at least one of a preset precoding resource block group PRG, a resource block group RBG, a system bandwidth, a configured control channel bandwidth, different aggregation levels, and different parameters of different E-CCEs at a same aggregation level, the number of REs included in the E-CCE.

The resource demapping module 7012 is configured to: perform resource demapping, from a preset start point of the E-CCE, first in a frequency domain and then in a time domain, or first in a time domain and then in a frequency domain, for the REs included in the E-CCE; if REs occupied by the predetermined overheads exist during the resource demapping, skip RE positions occupied by the predetermined overheads and perform resource demapping, where the number of demapped symbols is the number of REs included in the E-CCE after the REs occupied by the predetermined overheads are correspondingly subtracted; or if REs occupied by the predetermined overheads exist during the resource demapping, skip RE positions occupied by the predetermined overheads, where the number of demapped symbols is the number of REs included in the E-CCE.

It should be noted that the processing unit 701 is configured to process the E-CCE, where the E-CCE includes an E-CCE of a first type and/or an E-CCE of a second type, where the number of REs included in the E-CCE of the first type is fixed on a first specific resource, and REs included in the E-CCE of the second type change semi-statically or dynamically on a second specific resource.

The receiving unit 702 is configured to receive, over the REs included in the E-CCE, an extended physical downlink control channel E-PDCCH transmitted by a base station.

Further, the processing unit 701 is specifically configured to obtain, via the receiving unit 702 through broadcast, system information, or radio resource control protocol RRC signaling, REs included in the E-CCE of the first type and/or REs included in the E-CCE of the second type which are transmitted by the base station.

The above user equipment 70 corresponds to the above method embodiment. The user equipment 70 may be used in the steps of the above method embodiment, and for its specific application in each step, reference may be made to the above method embodiment, and will not be further described herein.

In the methods for transmitting and receiving a control channel, the base station, and the user equipment provided by the embodiments of the present invention, the base station determines, according to a system configuration and/or user configuration, REs included in an E-CCE, and transmits an E-PDCCH to the user equipment, where the E-PDCCH is carried by the E-CCE; and the user equipment obtains, by using the same setting method as the base station, the REs included in the E-CCE, and receives the E-PDCCH over the REs included in the E-CCE. The E-CCE is set fixedly and set dynamically or semi-statically, so that for available changing resources on the E-PDCCH carried by the E-CCE, a changing E-CCE is correspondingly available for transmission and reception, thereby improving transmission efficiency, and reducing transmission complexity.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various mediums capable of storing program codes, such as a ROM, a RAM, a magnetic disk or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   determining, by a terminal device, a resource set and resource elements (REs) of predetermined overheads in the resource set, wherein the REs of the predetermined overheads comprise at least one of following REs: a RE of a channel state information-reference signal (CSI-RS), a RE of a cell-specific reference signal (CRS), or a muted RE; and
   receiving, by the terminal device from a base station, a control channel carried on at least one control channel element, wherein the at least one control channel element comprises a RE subset comprised in the resource set, the RE subset comprises available REs in the resource set, and the available REs do not include the REs of the predetermined overheads,
   wherein resource demapping is performed, according to a quantity of REs comprised in the at least one control channel element, for the control channel from a preset start point of the at least one control channel element first in a frequency domain and then in a time domain, or first in a time domain and then in a frequency domain, wherein
     if at least one first RE occupied by at least one of the predetermined overheads exists during the resource demapping, the resource demapping is performed by skipping the at least one first RE and continuing to perform the resource demapping until the quantity of REs comprised in the at least one control channel element, wherein the at least first RE is counted in the quantity of REs comprised in the at least one control channel element; and/or
     if at least one second RE occupied by at least one of the predetermined overheads exists during the resource demapping, the resource demapping is not performed for the control channel in the at least one second RE, wherein the at least one second RE is not counted in the quantity of REs comprised in the at least one control channel element.

2. The method according to claim 1, wherein the one or more control channel elements are mapped in a centralized resource mapping mode.

3. The method according to claim 1, wherein
   the resource set is equally divided into resource subsets according to a predetermined quantity of control channel elements in the resource set,
   for each resource subset, a quantity of available REs for control channel transmission in the each resource subset is obtained according to a total quantity of REs in the each resource subset and a quantity of REs of the predetermined overheads in the each resource subset, and
   each resource subset corresponds to a control channel element.

4. The method according to claim 1, wherein the resource set comprises at least one of a physical resource block (PRB), a physical resource block pair, a precoding resource block group (PRG), a resource block group (RBG), and a set divided into various E-CCE resources.

5. The method according to claim 2, wherein the mapping is performed first in a frequency domain and then in a time domain.

6. The method according to claim 1, wherein a demodulation reference signal (DMRS) port of the at least one control channel elements is dynamically changeable.

7. The method according to claim 1, wherein a quantity of the available REs in each control channel element is dynamically changeable.

8. An apparatus, comprising:
   a storage medium including executable instructions; and a processor coupled to the storage medium and configured to execute the executable instructions to cause the apparatus to:
determine a resource set and resource elements (REs) of predetermined overheads in the resource set, wherein the REs of the predetermined overheads comprise at least one of following REs: a RE of a channel state information-reference signal (CSI-RS), a RE of a cell-specific reference signal (CRS), or a muted RE; and
receive a control channel carried on at least one control channel element, wherein the at least one control channel element comprises a RE subset comprised in the resource set, the RE subset comprises available REs in the resource set, and the available REs do not include the REs of the predetermined overheads,
wherein resource demapping is performed, according to a quantity of REs comprised in the at least one control channel element, for the control channel from a preset start point of the at least one control channel element first in a frequency domain and then in a time domain, or first in a time domain and then in a frequency domain, wherein
if at least one first RE occupied by at least one of the predetermined overheads exists during the resource demapping, the resource demapping is performed by skipping the at least one first RE and continuing to perform the resource demapping until the quantity of REs comprises in the at least one control channel element, wherein the at least first RE is counted in the quantity of REs comprised in the at least one control channel element; and/or
if at least one second RE occupied by at least one of the predetermined overheads exists during the resource demapping, the resource demapping is not performed for the control channel in the at least one second RE, wherein the at least one second RE is not counted in the quantity of REs comprised in the at least one control channel element.

9. The apparatus according to claim 8, wherein the one or more control channel elements are mapped in a centralized resource mapping mode.

10. The apparatus according to claim 8, wherein
the resource set is equally divided into resource subsets according to a predetermined quantity of control channel elements in the resource set,
for each resource subset, a quantity of available REs for control channel transmission in the each resource subset is obtained according to a total quantity of REs in the each resource subset and a quantity of REs of the predetermined overheads in the each resource subset, and
each resource subset corresponds to a control channel element.

11. The apparatus according to claim 8, wherein the resource set comprises at least one of a physical resource block (PRB), a physical resource block pair, a precoding resource block group (PRG), a resource block group (RBG), and a set divided into various E-CCE resources.

12. The apparatus according to claim 9, wherein the mapping is performed first in a frequency domain and then in a time domain.

13. The apparatus according to claim 8, wherein a demodulation reference signal (DMRS) port of the at least one control channel elements is dynamically changeable.

14. The apparatus according to claim 8, wherein a quantity of the available REs in each control channel element is dynamically changeable.

15. A non-transitory computer-readable storage medium comprising instructions that, when executed by a device, cause the device to carry out steps of:
determining a resource set and resource elements (REs) of predetermined overheads in the resource set, wherein the REs of the predetermined overheads comprise at least one of following REs: a RE of a channel state information-reference signal (CSI-RS), a RE of a cell-specific reference signal (CRS), or a muted RE; and
receiving a control channel carried on at least one control channel element, wherein the at least one control channel element comprises a RE subset comprised in the resource set, the RE subset comprises available REs in the resource set, and the available REs do not include the REs of the predetermined overheads,
wherein resource demapping is performed, according to a quantity of REs comprised in the at least one control channel element, for the control channel from a preset start point of the at least one control channel element first in a frequency domain and then in a time domain, or first in a time domain and then in a frequency domain, wherein
if at least one first RE occupied by at least one of the predetermined overheads exists during the resource demapping, the resource demapping is performed by skipping the at least one first RE and continuing to perform resource demapping until the quantity of REs comprised in the at least one control channel element, wherein the at least first RE is counted in the quantity of REs comprised in the at least one control channel element; and/or
if at least one second RE occupied by at least one of the predetermined overheads exists during the resource demapping, the resource demapping is not performed for the control channel in the at least one second RE, wherein the at least one second RE is not counted in the quantity of REs comprised in the at least one control channel element.

16. The non-transitory computer-readable storage medium according to claim 15, wherein the one or more control channel elements are mapped in a centralized resource mapping mode.

17. The non-transitory computer-readable storage medium according to claim 15, wherein
the resource set is equally divided into resource subsets according to a predetermined quantity of control channel elements in the resource set,
for each resource subset, a quantity of available REs for control channel transmission in the each resource subset is obtained according to a total quantity of REs in the each resource subset and a quantity of REs of the predetermined overheads in the each resource subset, and
each resource subset corresponds to a control channel element.

18. A method comprising:
determining, by a network device, a resource set and resource elements (REs) of predetermined overheads in the resource set, wherein the REs of the predetermined overheads comprise at least one of following REs: a RE of a channel state information-reference signal (CSI-RS), a RE of a cell-specific reference signal (CRS), or a muted RE;
performing, by the network device according to a quantity of REs comprised in at least one control channel element, resource mapping for at least one control channel element carrying a control channel, wherein if at least one first RE occupied by at least one of the predetermined overheads exists during the resource mapping, performing the resource mapping on the at least one first RE until the quantity of REs comprised in the at least one control channel element, wherein the control channel mapped to the at least first RE is punched for transmitting the at least one of the predetermined overheads; and/or if at least one second RE occupied by at least one of the predetermined overheads exists during the resource mapping, the resource mapping is not performed for the at least one control channel element in the at least one second RE, wherein the at least one second RE is not counted in the quantity of REs comprised in the at least one control channel element; and sending, by the network device, the control channel carried on the at least one control channel element.

19. The method according to claim 18, wherein the resource set is equally divided into resource subsets according to a predetermined quantity of control channel elements in the resource set, wherein for each resource subset, a quantity of available REs for control channel transmission in the each resource subset is obtained according to a total quantity of REs in the each resource subset and a quantity of REs of the predetermined overheads in the each resource subset, and wherein each resource subset corresponds to a control channel element.

20. The method according to claim 18, wherein a demodulation reference signal (DMRS) port of the at least one control channel elements is dynamically changeable.

21. An apparatus comprising:

a storage medium including executable instructions; and a processor coupled to the storage medium and configured to execute the executable instructions to cause the apparatus to:

determine a resource set and resource elements (REs) of predetermined overheads in the resource set, wherein the REs of the predetermined overheads comprise at least one of following REs: a RE of a channel state information-reference signal (CSI-RS), a RE of a cell-specific reference signal (CRS), or a muted RE; perform, according to a quantity of REs comprised in at least one control channel element, resource mapping for at least one control channel element carrying a control channel, wherein if at least one first RE occupied by at least one of the predetermined overheads exists during the resource mapping, performing the resource mapping on the at least one first RE until the quantity of REs comprised in the at least one control channel element, wherein the control channel mapped to the at least first RE is punched for transmitting the at least one of the predetermined overheads; and/or if at least one second RE occupied by at least one of the predetermined overheads exists during the resource mapping, the resource mapping is not performed for the at least one control channel element in the at least one second RE, wherein the at least one second RE is not counted in the quantity of REs comprised in the at least one control channel element; and send the control channel carried on the at least one control channel element.

22. The apparatus according to claim 21, wherein the resource set is equally divided into resource subsets according to a predetermined quantity of control channel elements in the resource set, and for each resource subset: a quantity of available REs for control channel transmission in the each resource subset is obtained according to a total quantity of REs in the each resource subset and a quantity of REs of the predetermined overheads in the each resource subset, and each resource subset corresponds to a control channel element.

23. The apparatus according to claim 21, wherein a demodulation reference signal (DMRS) port of the at least one control channel elements is dynamically changeable.

* * * * *